US008300391B2

United States Patent
Hu

(10) Patent No.: US 8,300,391 B2
(45) Date of Patent: Oct. 30, 2012

(54) ROTATION ANGLE LIMITATION DEVICE AND PORTABLE ELECTRONIC DEVICE HAVING THE SAME

(75) Inventor: Li-Hau Hu, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 283 days.

(21) Appl. No.: 12/762,405

(22) Filed: Apr. 19, 2010

(65) Prior Publication Data

US 2011/0110027 A1      May 12, 2011

(30) Foreign Application Priority Data

Nov. 11, 2009   (TW) .............................. 98138279 A

(51) Int. Cl.
*G06F 1/16*      (2006.01)
(52) U.S. Cl. ......... 361/679.07; 361/679.06; 361/679.27; 248/917; 248/920
(58) Field of Classification Search .............. 361/679.07
See application file for complete search history.

(56) References Cited

U.S. PATENT DOCUMENTS

| | | | |
|---|---|---|---|
| 6,850,407 B2 | 2/2005 | Tanimoto et al. | |
| 7,129,931 B2 * | 10/2006 | Pappas | 345/168 |
| 7,319,583 B2 * | 1/2008 | Tseng et al. | 361/679.27 |
| 7,610,658 B2 * | 11/2009 | Lee et al. | 16/367 |
| 7,706,137 B2 * | 4/2010 | Iijima et al. | 361/679.07 |
| 7,800,893 B2 * | 9/2010 | Tracy et al. | 361/679.27 |
| 2003/0052857 A1 * | 3/2003 | Pappas | 345/156 |
| 2004/0012920 A1 * | 1/2004 | Tanimoto et al. | 361/683 |
| 2005/0207104 A1 * | 9/2005 | Love | 361/683 |

* cited by examiner

*Primary Examiner* — Anthony Q Edwards
(74) *Attorney, Agent, or Firm* — Alan Kamrath; Kamrath IP Lawfirm, PA

(57) ABSTRACT

A rotation angle limitation device used for a portable electronic device includes a base including a placed portion and at least one positioning portion. A driven element connected to the placed portion is capable of being rotated relative to the base. The driven element has a first position and a second position and is secured by the positioning portion when the driven element is in the second position. An elastic element is disposed between the placed portion and the driven element. A first rotation shaft is pivotally connected to the placed portion and is capable of rotating along a first direction. The first rotation shaft and the driven element move simultaneously. A second rotation shaft is pivotally connected to the first rotation shaft and is capable of rotating along a second direction. At least one cam is connected to the second rotation shaft, and the at least one cam and the second rotation shaft move simultaneously. Each cam includes a first protruding portion and a concave arc adjacent to the first protruding portion.

9 Claims, 7 Drawing Sheets

ROTATION ANGLE LIMITATION DEVICE AND PORTABLE ELECTRONIC DEVICE HAVING THE SAME

BACKGROUND OF THE INVENTION

1. Field of the Invention

The present invention relates to a rotation angle limitation device and an electronic device comprising the rotation angle limitation device.

2. Description of the Related Art

There is prior technology whereby the screen of a notebook computer can be rotated along two rotational axes. The screen can be rotated in the opening direction, and it can also be rotated in a lateral direction. Usually, the notebook computer screen can be opened from 0 up to 180 degrees. Therefore, if the opening angle of the screen is too small (e.g., close to 0 degrees) or too large (close to 180 degrees), the screen casing could be easily scratched if one tries to rotate it laterally. Currently, there is no design to restrict lateral rotation movement of a notebook screen when the opening angle of the notebook is too small or too large.

In order to reduce scratching of the screen casing, the prior art has presented a method involving placing a wear-resistant rubber pad at the bottom of the screen. When the opening angle is large and the screen is rotated laterally, the rubber pad will be in direct contact with the hard surface such as the desktop, thus reducing damage to the screen casing. However, this method cannot prevent the screen casing from being scratched during a lateral rotation when the opening angle is very small.

In addition, the opening angle of a notebook computer lies between 0 degrees and 180 degrees. The general approach to maintain the screen in position is to introduce a positioning column that has a protruding-shape on the edge of the computer, and pairing the positioning column with concave shapes in order to secure the screen in a relative position to the laptop computer. However, the use of a positioning column will affect the appearance and also cause discomfort when touched by the users.

Therefore, it is necessary to provide a rotation angle limitation device and a portable electronic device comprising the rotation angle limitation device to resolve the above-mentioned problems.

SUMMARY OF THE INVENTION

The object of the present invention is to provide a rotation angle limitation device that can be used in a portable electronic device. The rotation angle limitation device can restrict the screen of the portable electronic device from rotating laterally when the opening angle is in a specific range.

Another object of the present invention is to provide a portable electronic device consisting of the rotation angle limitation device, whereby the screen is restricted from rotating laterally when the opening angle is in a specific range.

In order to achieve the above mentioned objectives, the rotation angle limitation device of the present invention comprises: a base comprising a placed portion and at least one positioning portion; a driven element connected to the placed portion capable of being rotated relative to the base, with the driven element having a first position and a second position and secured by the positioning portion when the driven element is in the second position; an elastic element disposed between the placed portion and the driven element in order to provide the driven element with an upward restoration force to move away from the base; a first rotation shaft pivotally connected to the placed portion, with the first rotation shaft capable of rotating along a first direction, and with the first rotation shaft and the driven element moving simultaneously; a second rotation shaft pivotally connected to the first rotation shaft, with the second rotation shaft capable of rotating along a second direction; and at least one cam connected to the second rotation shaft. The at least one cam and the second rotation shaft moving simultaneously. Each cam comprises a first protruding portion and a concave arc, with the first protruding portion and the concave arc adjacent to each other. When the concave arc substantially comes into contact with the driven element located in the first portion, the driven element will be separated from at least one position portion. The first rotation shaft can rotate along the first direction. When the first protruding portion presses against the driven element, the driven element moves to the second position, such that the driven element is fixed with at least one positioning portion, and such that the first rotation shaft cannot rotate along the first direction.

In order to achieve another objective, the portable electronic device having a rotation angle limitation device comprises the abovementioned rotation angle limitation device.

DETAILED DESRIPTION OF THE PREFFFERED EMBODIMENTS

The advantages and innovative features of the invention will become more apparent from the following preferred embodiments.

Figure 1:
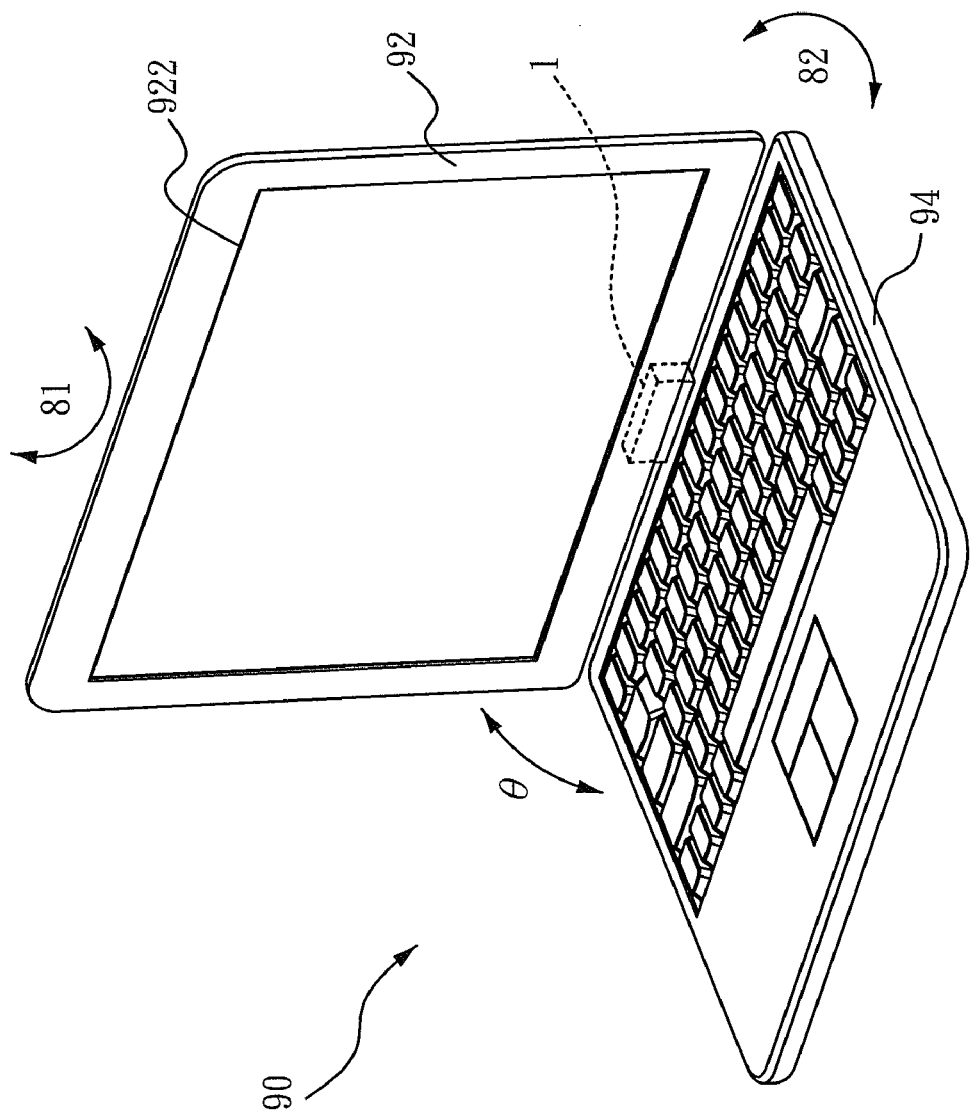
FIG. 1 shows the portable electronic device of the present invention.

Refer to FIG. 1 for the portable electronic device of the present invention. The portable electronic device 90 comprises a top section 92, a bottom section 94, and a rotation angle limitation device 1. The rotation angle limitation device 1 connects the top section 92 and the bottom section 94. A part of the rotation angle limitation device 1 is located within the top section 92, and the other part is located within the bottom section 94. An opening angle θ is formed between the top section 92 and the bottom section 94. The top section 92 can rotate relative to the bottom section 94 in a first direction 81, or in a second direction 82. The second direction 82 is substantially perpendicular to the first direction 81. Rotating the top section 92 towards the first direction 81 makes the screen 922 of the top section 92 face a lateral direction. In this embodiment, the portable electronic device 90 is a laptop computer, but this invention is not limited to this device.

However, when the opening angle θ is less than 30 degrees or above 150 degrees, the external casing of the portable electronic device 90 may be scratched or damaged when the top section 92 rotates in the first direction 81. Therefore, the rotation angle limitation device 1 of the present invention is designed to limit the top section 92 from rotating in the first direction 81 when θ is within a specific range (e.g., when angle θ is in the range close to 0 degrees or close to 180 degrees). This prevents the top section 92 from colliding with the bottom section 94, and prevents scratching of the casing of the portable electronic device 90. The detailed structure of the rotation angle limitation device 1 is described in the subsequent section.

Figure 2:
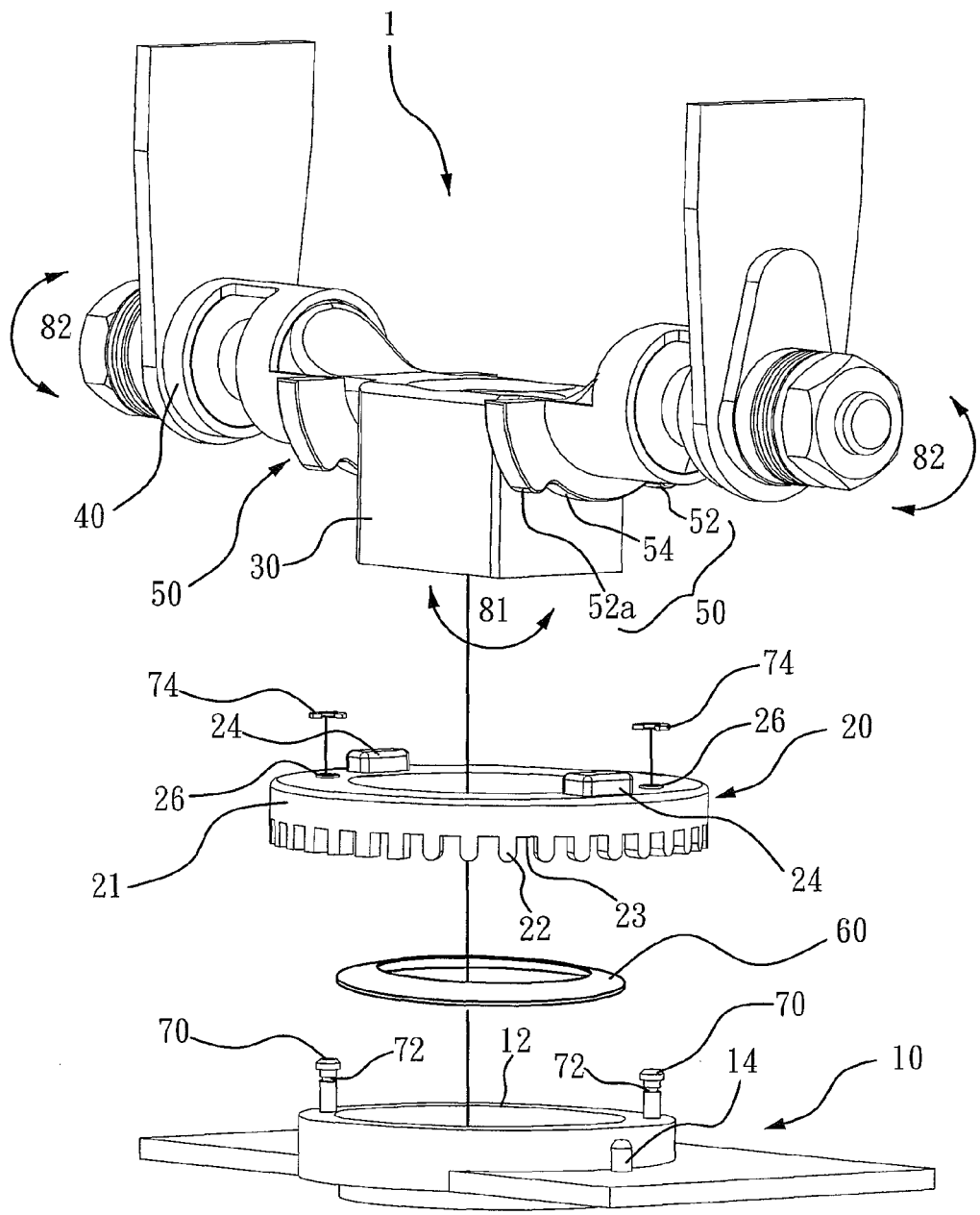
FIG. 2 shows an exploded view of the rotation angle limitation device.
Figure 3:
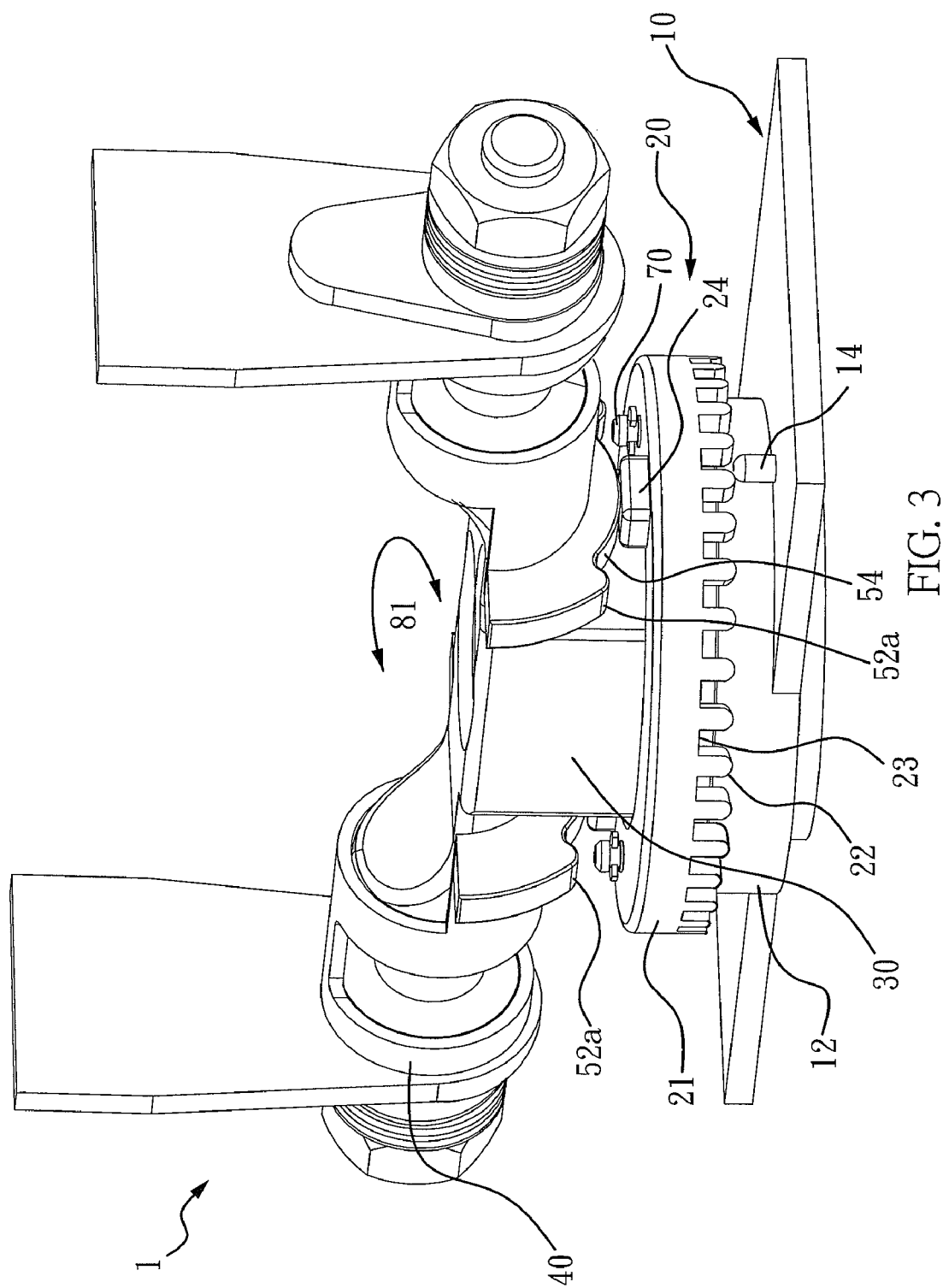
FIG. 3 is a 3-D diagram showing the rotation angle limitation device when the opening angle is at 90 degrees.

Please refer to FIG. 2 and FIG. 3. FIG. 2 shows the exploded view of the rotation angle limitation device. FIG. 3 is a 3-D diagram showing the rotation angle limitation device 1 when the opening angle θ is at 90 degrees. The rotation angle limitation device 1 comprises a base 10, a driven element 20, at least one elastic element 60, a first rotation shaft 30, a second rotation shaft 40, and at least one cam 50.

The base 10 comprises a placed portion 12 and at least one positioning portion 14. The placed portion 12 can be rotated. The placed portion 12 is used to accommodate the driven element 20. In this embodiment, the base 10 comprises two positioning portions 14, which are located on opposite sides of the placed portion 12. In this embodiment, the positioning portion 14 is a convex column, and the tip of each column has a rounded shape. However, the positioning portion 14 is not limited to the above mentioned shape or quantity.

Figure 4:
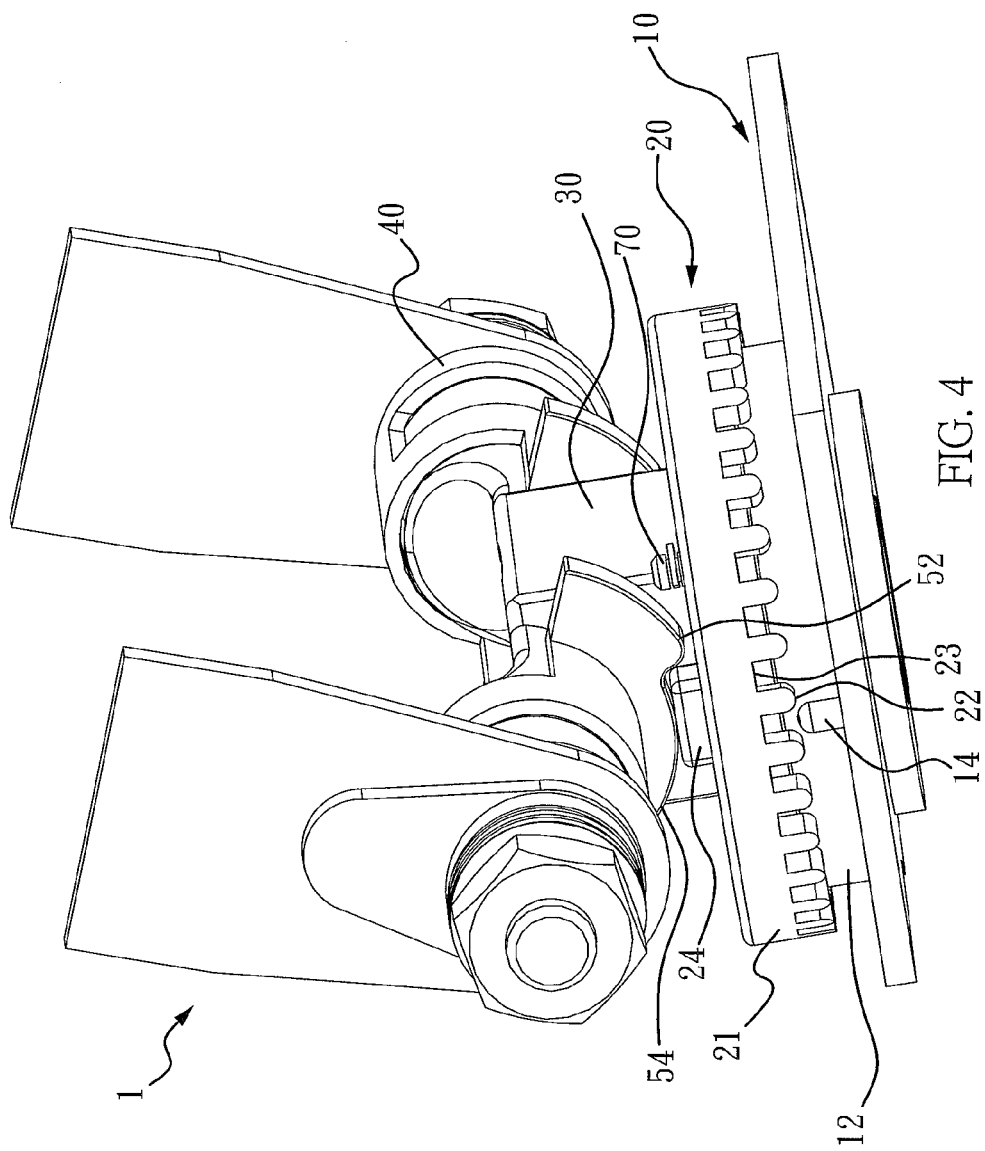
FIG. 4 is a 3-D diagram depicting the present invention when the opening angle θ of the rotation angle limitation device is at 115 degrees.
Figure 5:
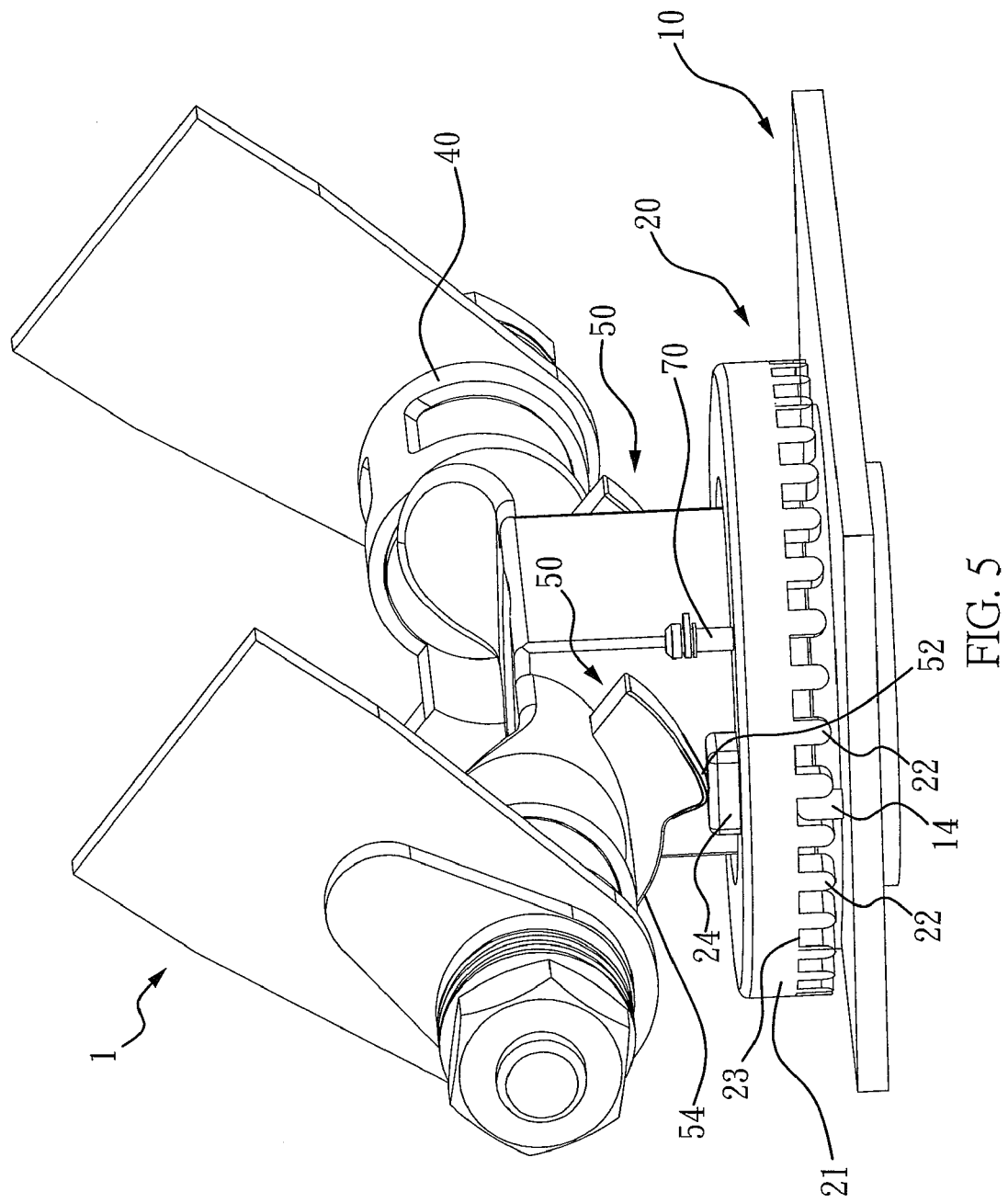
FIG. 5 is a 3-D diagram depicting the present invention when the opening angle of the rotation angle limitation device is slightly greater than 115 degrees.
Figure 6:
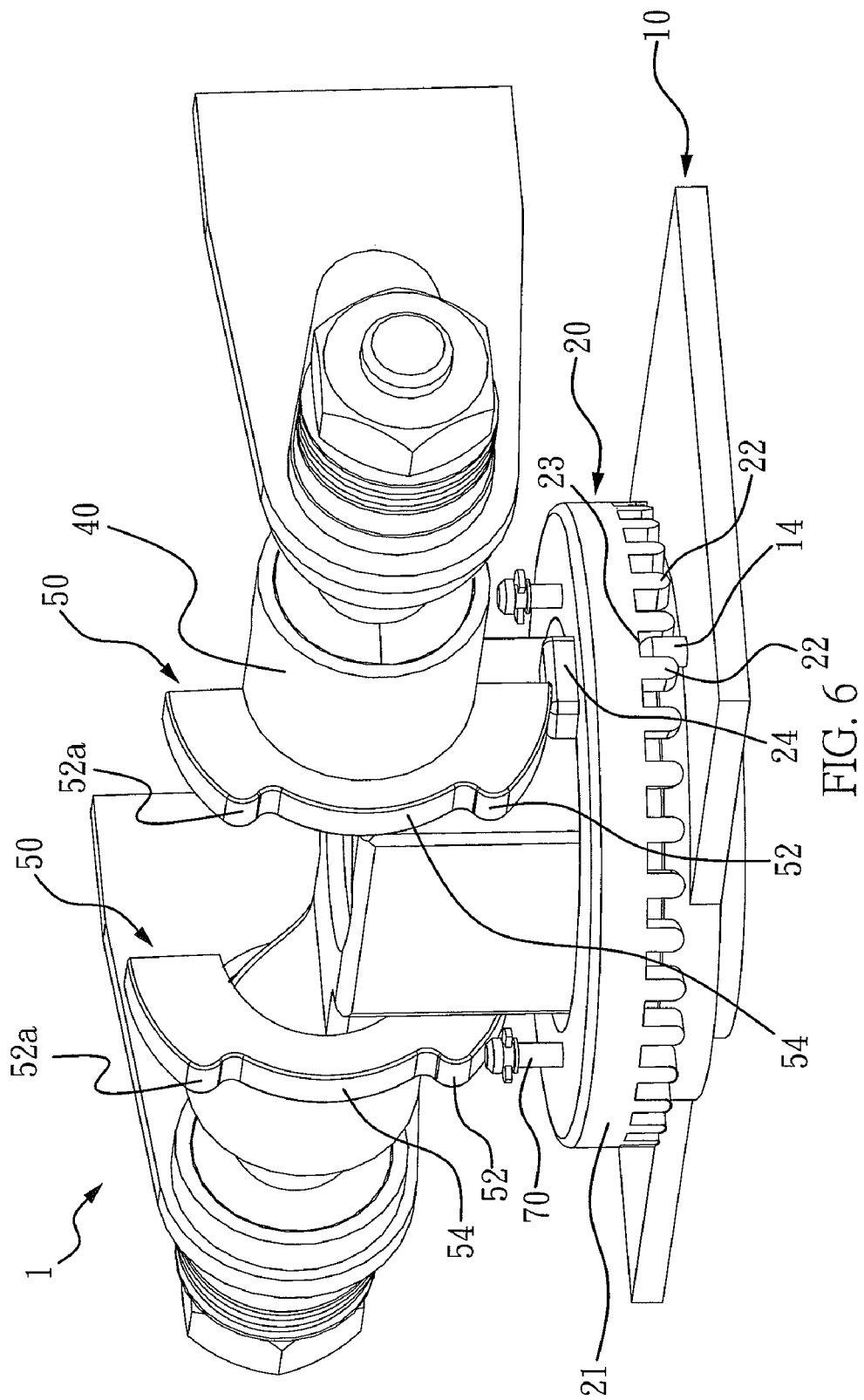
FIG. 6 is a 3-D diagram depicting the present invention when the opening angle of the rotation angle limitation device is at 180 degrees.

The driven element 20 is placed in the placed portion 12, and it can rotate respective to the base 10. The driven element 20 can be driven by the placed portion 12 such that the driven element 20 and the placed portion 12 rotate together. The driven element 20 corresponds to the first position and to the second position of the base 10. At the first position, the position of the driven element 20 is higher (as shown in FIG. 3 or FIG. 4). At this instant, the driven element 20 can still rotate, as it has not been fixed by the positioning portion 14. At the second position, the driven element 20 is pressed down by a first protruding portion 52 or a second protruding portion 52a of the cam 50. Therefore, the position of the driven element 20 is slower (as shown in FIG. 5 or FIG. 6). At this instant, the rotation movement of the driven element 20 is locked by the positioning portion 14.

In this embodiment, the driven element 20 comprises a gear plate 21. The gear plate 21 comprises multiple gears 22 and multiple concave portions 23 arranged in an alternating manner. When the driven element 20 is in the second position, at least a portion of the plurality of concave portions 23 of the gear plate 21 is positioned in at least one positioning portion 14. In addition, the tip of each gear 22 has a rounded corner. The rounded corner of each gear 22 aids the positioning portion 14, which also has a rounded corner, to slip into the concave portion 23. Please note that the driven element 20 and the positioning portion 14 are not limited only to the above-mentioned structure.

In this embodiment, the top surface of the driven element 20 further comprises at least one contact section 24 having a protruding shape.

The contact section 24 directly contacts the first protruding portion 52, the second protruding portion 52a, or a concave arc 54 of the cam 50, and the contact section 24 is made of a wear-resistant material. In this embodiment, there are two contact sections 24, which match with the positions of the cam 50. It should be noted that the distance of the first protruding portion 52 or the second protruding portion 52a of the cam 50 can also be shifted by pressing against the top surface of the gear plate 21, and the contact section 24 is not necessarily required.

In the present embodiment, the base 10 is implemented with at least one guiding element 70. The guiding element 70 guides the driven element 20 vertically in order to facilitate the movement between the first position and the second position, and it also prevents the driven element 20 from moving away from the place portion 12. In other words, the guiding element 70 is mounted vertically on the surface of the placed portion 12 of the base 10. When the driven element 20 is placed on top of the base 10, the guiding elements 70 will pass through the respective holes 26, which are based on the driven element 20. A ring groove 72 is placed on guiding element 70, which can be embedded with a C-shaped ring 74 in order to secure the driven element 20 onto the base 10.

The elastic element 60 is disposed between the placed portion 12 and the driven element 20 in order to provide the driven element 20 with an upward restoration force to move away from the base 10. When the driven element 20 is pressed downward, the elastic element 60 is compressed and accumulates a restoration force. When the downward pressure is removed from the driven element 20, the restoration force of the elastic element 60 imposes an upward moving force on the driven element 20. In this embodiment, the elastic piece 60 is a ring-shaped spring or a wave-shaped spring. However, the structure of the elastic piece 60 is not limited to the above-mentioned configurations.

The first rotation shaft 30 is connected to the placed portion 12 of the base 10. The first rotation shaft 30 can drive the placed portion 12 such that the first rotation shaft 30 and the placed portion 12 rotate together. The first rotation shaft 30 is capable of rotating along the first direction 81, and the first rotation shaft 30 and the driven element 20 move simultaneously.

The second rotation shaft 40 is pivotally connected to the first rotation shaft 30. The second rotation shaft 40 is capable of rotating along the second direction 82 and is responsible for the opening angle θ.

At least one cam 50 is connected to the second rotation shaft 40, and the at least one cam 50 and the second rotation shaft 40 move simultaneously. The cam 50 comprises the first protruding portion 52, the second protruding portion 52a, and the concave arc 54, and the first protruding portion 52 and the second protruding portion 52a are adjacent to the concave arc 54. In other words, the concave arc 54 is located between the first protruding portion 52 and second protruding portion 52a. The concave arc 54 is the circular path having a smaller radius. The first protruding portion 52 and the second protruding portion 52a comprise the circular path having a greater radius. When the first protruding portion 52 or the second protruding portion 52a of the cam 50 presses down on the driven element 20, the driven element 20 can be moved downward. In the present embodiment, there are two cams 50, which are located on the second rotation shaft 40, next to both sides of the first rotation shaft 30.

In the present embodiment (as shown in FIG. 2), the cam 50 is implemented on a shaft cover, and the shaft cover is secured on the second rotation shaft 40, but the present invention is not limited to the above configuration. For example, the cam 50 and the second rotation shaft 40 can also be made in one piece.

The following description describes the different stages in which the rotation angle limitation device 1 moves.

(1) Opening angle θ between 65 degrees to 115 degrees: In this embodiment, the first rotation shaft 30 and the driven element 20 can move freely in the first direction 81 when the opening angle θ is at 65 degrees to 115 degrees. Refer to FIG.

3. The opening angle θ of this stage is represented by a 90-degree angle. At this stage, the concave arc 54 of the cam 50 is in slight contact with the contact section 24 of the driven element 20. The driven element 20 is in the first position, which is at a higher position. At this instant, the gear plate 21 of the driven element 20 is completely separated from the positioning portion 14. Because the gear plate 21 of the concave portion 23 is not fixed with the positioning portion 14, the driven element 20 and the first rotation shaft 30 can simultaneously rotate along the first direction 81.

Take note that in this stage, the concave arc 54 does not come into contact with the contact section 24 of the driven element 20, and a gap can be formed between the concave arc 54 and the contact section 24.

Also take note that the opening angle θ in this stage is not limited to the abovementioned configuration, as it can also be modified according to the design requirements. The opening angle θ in this stage can be modified by simply altering the position of the concave arc 54.

(2) Opening angle θ at 115 degrees:

Refer to FIG. 4, which shows a 3-D diagram of the present invention when the opening angle θ of the rotation angle limitation device 1 is at 115 degrees.

In this embodiment, the first protruding portion 52 will press against the contact section 24 of the driven element 20 when the opening angle θ exceeds 115 degrees. Thus, 115 degrees is the critical angle.

Take note that the critical angle of the present invention is not limited to the abovementioned configuration, as it can be altered according to the design requirements. The critical angle can be altered by changing the boundary position between the first protruding portion 52 and the concave arc 54.

(3) Opening angle θ greater than 115 degrees:

Refer to FIG. 5 and FIG. 6. FIG. 5 shows a 3-D diagram of the present invention when the opening angle θ of the rotation angle limitation device 1 is slightly greater than 115 degrees. FIG. 6 shows a 3-D diagram of the present invention when the opening angle θ of the rotation angle limitation device is at 180 degrees.

As shown in FIG. 5, first protruding portion 52 presses down on the contact section 24 of the driven element 20 such that the driven element 20 moves downward into the second position. The positioning portion 14 enters into the concave portion 23 located between the adjacent gears 22 of the gear plate 21 (as shown in FIG. 5), such that the driven element 20 is fixed by the positioning portion 14. The concave portion 23 is locked by the positioning portion 14. Therefore, the driven element 20 and the first rotation shaft 30 are unable to rotate along the first direction 81.

As shown in FIG. 6, the first protruding portion 52 is constantly pressed down against the driven element 20 when the opening angle θ is increased from 115 degrees to 180 degrees.

Figure 7:
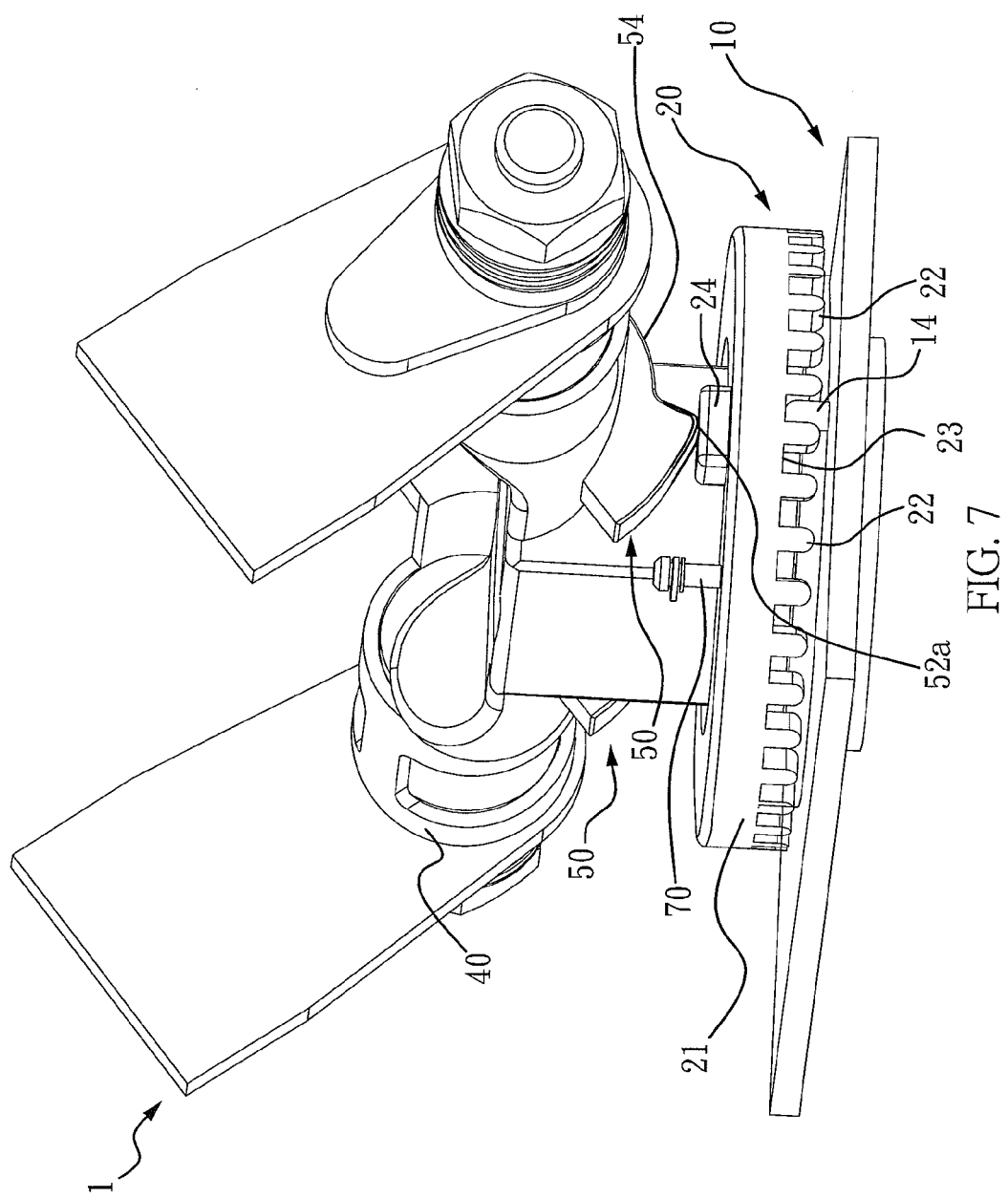
FIG. 7 is a 3-D diagram depicting the present invention when the opening angle of the rotation angle limitation device is slightly less than 65 degrees.

(4) Opening angle θ less than 65 degrees:

Refer to FIG. 7, which shows a 3-D diagram of the present invention when the opening angle θ of the rotation angle limitation device 1 is slightly less than 65 degrees. When the opening angle θ is less than 65 degrees, the movement is similar to stage 3, in which the opening angle θ is greater than 115 degrees. It is different, however, in that the second rotation shaft 40 rotates in the opposite direction, and the contact section 24 of the driven element 20 is pressed by the second protruding portion 52a. When the opening angle θ is between 0 and 65 degrees, the second protruding portion 52a presses down on the contact section 24 of the driven element 20 such that the gear plate 21 of the driven element 20 is fixed at the positioning portion 14. Take note that the opening angle θ is not limited to the abovementioned angle range.

Although the present invention has been explained in relation to its preferred embodiments, it is also of vital importance to acknowledge that many other possible modifications and variations can be made without departing from the spirit and scope of the invention as hereinafter claimed.

What is claimed is:

1. A rotation angle limitation device used by a portable electronic device, with the portable electronic device comprising a top section and a bottom section forming an opening angle; wherein the top section rotates respective to the bottom section in a first direction or in a second direction, wherein the second direction is substantially perpendicular to the first direction, with the rotation angle limitation device comprising:

a base comprising a placed portion and at least one positioning portion;

a driven element connected to the placed portion and rotatable relative to the base, wherein the driven element has a first position and a second position, and wherein the driven element is secured by the positioning portion when the driven element is in the second position;

an elastic element disposed between the placed portion and the driven element to provide the driven element with an upward restoration force to move away from the base;

a first rotation shaft pivotally connected to the placed portion, with the first rotation shaft rotating along the first direction, and wherein the first rotation shaft and the driven element move simultaneously;

a second rotation shaft pivotally connected to the first rotation shaft, with the second rotation shaft rotating along the second direction; and at least one cam connected to the second rotation shaft, wherein the at least one cam and the second rotation shaft move simultaneously, wherein each cam comprises a first protruding portion and a concave arc, wherein the first protruding portion is adjacent to the concave arc, wherein when the concave arc substantially comes in contact with the driven element located in the first position, the driven element is separated from the at least one positioning portion and the first rotation shaft rotates along the first direction, wherein when the first protruding portion presses against the driven element, the driven element moves into the second position, the driven element is fixed with the at least one positioning portion and the first rotation shaft cannot rotate along the first direction, wherein the driven element comprises a gear plate; wherein the positioning portion is a pillar; wherein the gear plate comprises a plurality of gears and a plurality of concave portions arranged in an alternating manner; and wherein when the driven element is in the second position, at least a portion of the concave portion of the gear plate is secured with the pillar.

2. The rotation angle limitation device as claimed in claim 1, wherein every gear and pillar has a rounded corner.

3. The rotation angle limitation device as claimed in claim 1, wherein the opening angle lies between 115 to 180 degrees while the first protruding portion presses against the driven element and the driven element is secured by the positioning portion.

4. The rotation angle limitation device as claimed in claim 3, wherein the cam further comprises a second protruding portion, wherein the concave arc lies between the first protruding portion and the second protruding portion; and wherein when the second protruding portion presses against the driven element, the driven element moves to the second position and the driven element is secured by the positioning portion.

5. The rotation angle limitation device as claimed in claim 4, wherein the opening angle lies between 0 to 65 degrees when the second protruding portion presses against the driven element and the driven element is secured by the at least one positioning portion.

6. The rotation angle limitation device as claimed in claim 5, wherein the surface of the driven element further comprises at least one contact section used to contact the first protruding portion, the second protruding portion, or the concave arc.

7. The rotation angle limitation device as claimed in claim 6, further comprising a guiding element mounted on the base to guide the gear plate in moving towards a certain direction.

8. A portable electronic device, wherein the portable electronic device comprises the rotation angle limitation device as claimed in claim 1.

9. The portable electronic device as claimed in claim 8, wherein the portable electronic device is a laptop computer.

* * * * *